United States Patent [19]

Nagashima

[11] Patent Number: 5,486,918
[45] Date of Patent: Jan. 23, 1996

[54] OPTICAL WAVELENGTH METER WITH AN UP-DOWN COUNTER WHICH MEASURES THE AMOUNTS OF THE OVERSHOOT AND THE BACK-SHIFT OF THE MOVING MIRROR

[75] Inventor: Shinya Nagashima, Tokyo, Japan

[73] Assignee: Ando Electric Co., Ltd., Tokyo, Japan

[21] Appl. No.: 389,397

[22] Filed: Feb. 16, 1995

[30]     Foreign Application Priority Data

Feb. 28, 1994  [JP]  Japan ................................ 6-054586

[51] Int. Cl.$^6$ ............................................... G01B 9/02
[52] U.S. Cl. ..................... 356/346; 356/358; 356/356; 250/237 G
[58] Field of Search ............................... 356/345, 358, 356/346, 356; 250/237 G

[56]          References Cited

U.S. PATENT DOCUMENTS

5,123,742  6/1992  Takizawa et al. ...................... 356/358
5,270,790  12/1993  Matsumura ............................ 356/346

*Primary Examiner*—Samuel A. Turner
*Assistant Examiner*—Robert Kim
*Attorney, Agent, or Firm*—Finnegan, Henderson, Farabow, Garrett & Dunner

[57]          ABSTRACT

The purpose of the present invention is to provide a highly accurate optical wavelength meter in which the accurate starting and stop points of the measurement are detected. In accordance with the present invention, a detector which detects the back-shift of the moving mirror due to elastic force of the belt and an up-down counter which measures the amounts of the overshoot and the back-shift of the moving mirror so as to cancel the overshoot and the back-shift are provided, by which the accurate starting and stop points of the measurement can be detected.

4 Claims, 5 Drawing Sheets

FIG. 1

OPTICAL WAVELENGTH METER WITH AN UP-DOWN COUNTER WHICH MEASURES THE AMOUNTS OF THE OVERSHOOT AND THE BACK-SHIFT OF THE MOVING MIRROR

BACKGROUND OF THE INVENTION

1. Field of the Invention

The present invention relates to an optical wavelength meter, and more specifically to one which measures the wavelength of light to be measured by using an interferometer.

2. Background Art

Figure 4:
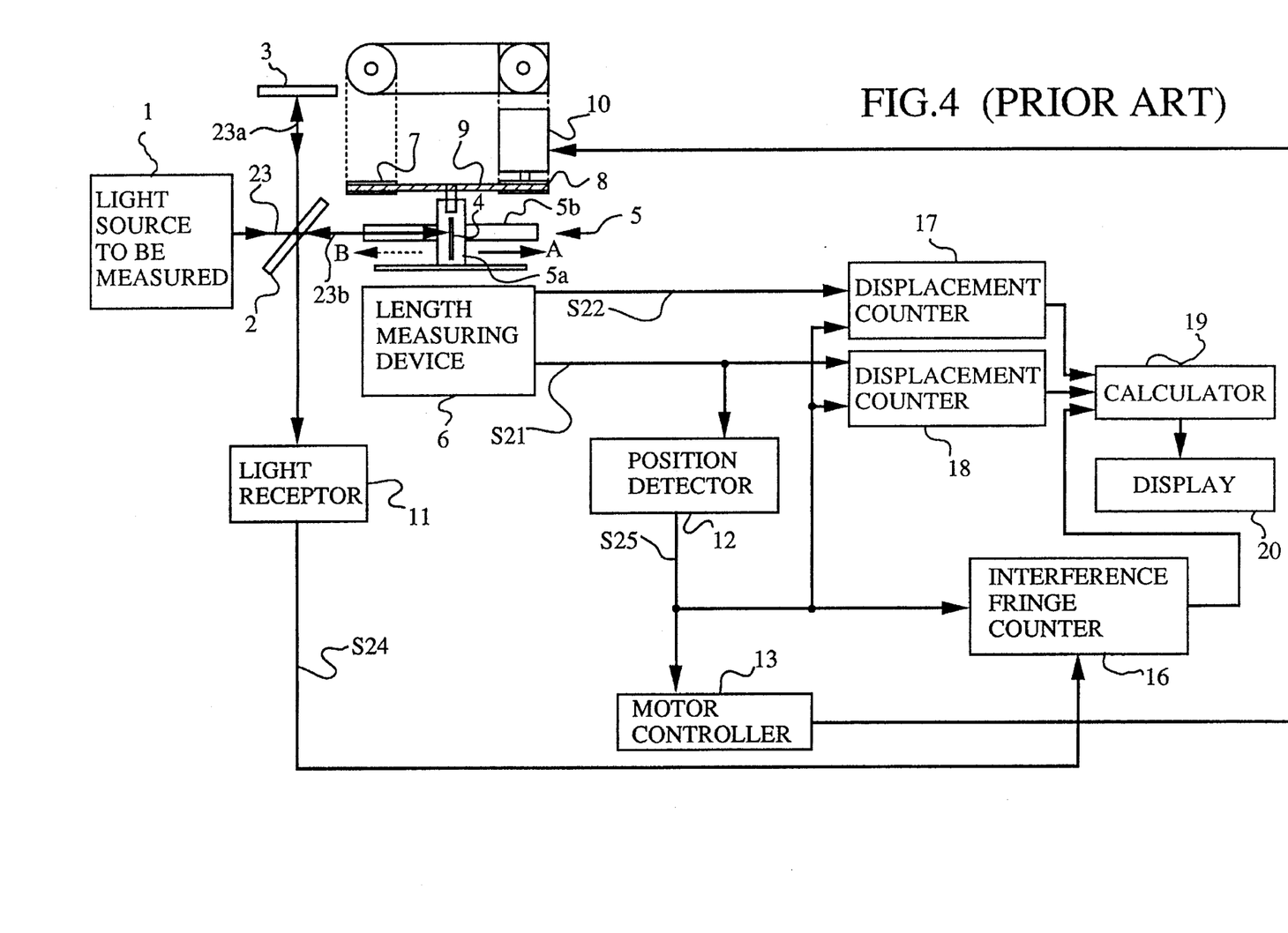
FIG. 4 is a block diagram of the conventional optical wave meter.
Figure 5:
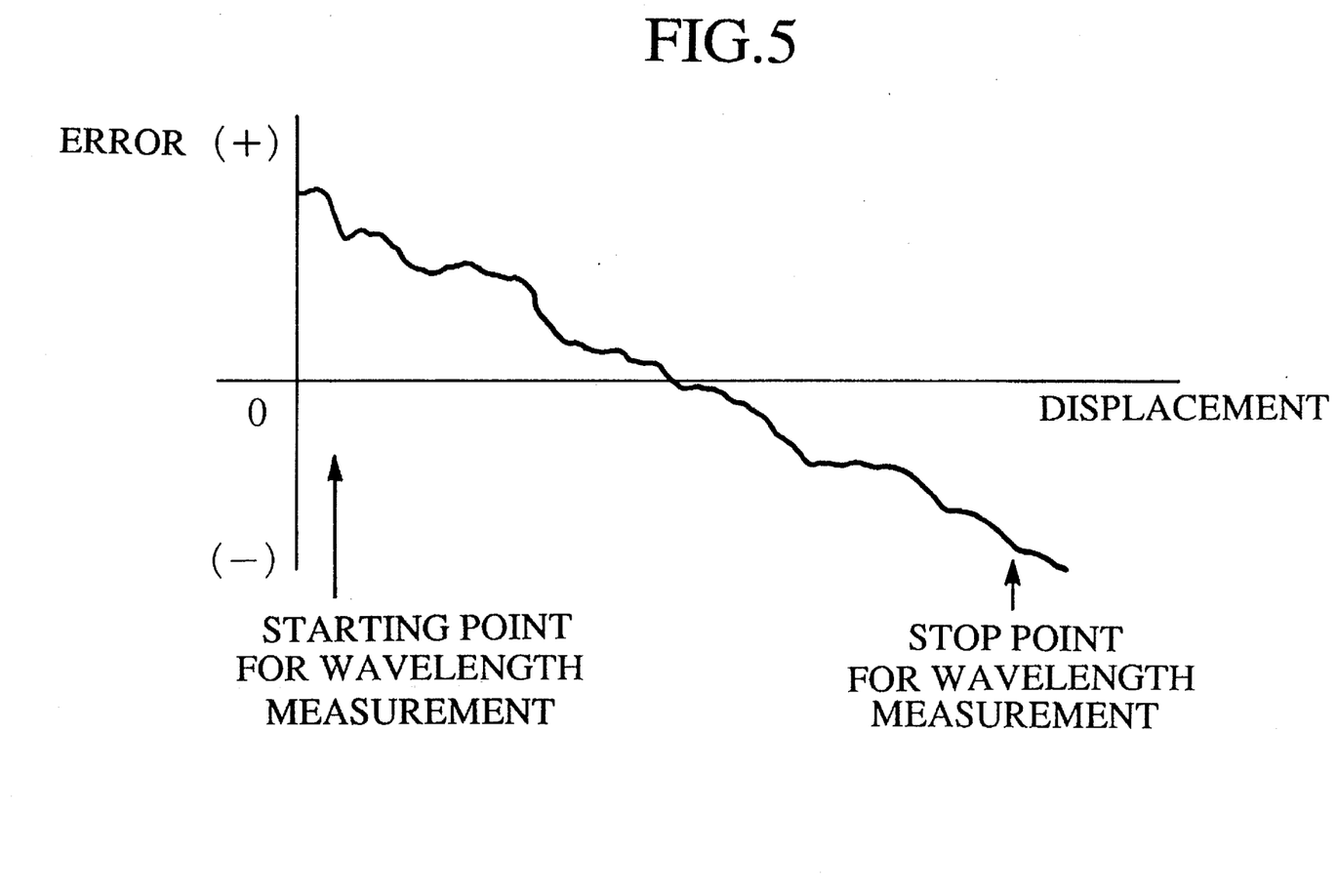
FIG. 5 is a characteristic chart of the distance accuracy of the length measuring device shown in FIG. 4.

FIGS. 4 and 5 are for the purpose of explaining a conventional optical wave meter. FIG. 4 is a block diagram of the conventional optical wave meter. FIG. 5 is a characteristic chart of the distance accuracy of length measuring device 6 in FIG. 4, and the vertical axis in FIG. 5 corresponds to the measurement error, while the horizontal axis in FIG. 5 corresponds to the displacement.

In FIG. 4, reference numeral 1 indicates a light source to be measured, reference numeral 2 indicates a beam splitter, reference numeral 3 indicates a fixed mirror, reference numeral 4 indicates a moving mirror, reference numeral 5 indicates a direct acting mechanism which has a moving stage 5a and a guide rail 5b, reference numeral 6 indicates a length measuring device, reference numerals 7 and 8 indicate pulleys, reference numeral 9 indicates a belt, reference numeral 10 indicates a motor, reference numeral 11 indicates a light receptor, reference numeral 12 indicates a position detector, reference numeral 13 indicates a motor controller, reference numeral 16 indicates an interference fringe counter, reference numerals 17 and 18 indicate displacement counters, reference numeral 19 indicates a calculator, and reference numeral 20 indicates a display.

Light 23 to be measured, which is output from light source 1 to be measured and whose wavelength is unknown, is split into reflected light 23a and transmitted light 23b by beam splitter 2. The reflected light 23a is further reflected by fixed mirror 3 (for example, a corner-cube prism) and transmitted through the beam splitter 2 to be incident on light receptor 11. On the other hand, transmitted light 23b is reflected by moving mirror 4 (for example, a corner-cube prism) and further reflected by the beam splitter 2 to be incident on light receptor 11.

Reflected light 23a and transmitted light 23b, both input to light receptor 11, interfere with each other; thus, electric signal S24 which corresponds to the intensity of the interference light is output from the light receptor 11 to be input to interference fringe counter 16.

When motor 10 rotates, belt 9 (for example, a rubber belt) which is stretched over pulleys 7 and 8, moves in one of the directions along the light axis of light 23 (or 23b), and moving stage 5a of direct acting mechanism 5, the stage 5a being connected to the belt 9, and the moving mirror 4 which is fixed to the stage 5a also move in one of the directions along the light axis of light 23.

Accordingly, when moving mirror 4 moves in one of the directions along the light axis of light 23, electric signal S24 from light receptor 11 becomes a signal which corresponds to the cyclic variation of light intensity due to the interference. In addition, the wavelength of the electric signal corresponds to the wavelength of light 23 to be measured.

On the other hand, when moving mirror 4 moves, length measuring device 6, which consists of a scale and a sensor, outputs pulse signal S21 to position detector 12 and displacement counter 18. Each pulse of the signal corresponds to the length decided by the resolution of displacement of the sensor. At the same time, the length measuring device 6 outputs pulse signal S22, which is delayed by 90° with regard to the phase to the signal S21, to displacement counter 17.

Position detector 12 counts a predetermined number of waves of pulse signal S21 from the length measuring device 6. When the detector 12 has detected that the moving mirror 4 moved by the distance corresponding to the predetermined number of waves, the detector 12 outputs position signal S25 to motor controller 13, interference fringe counter 16, and displacement counters 17 and 18. Motor controller 13 inverts the rotational direction of motor 10 every time the controller receives the position signal S25.

When position signal S25 is input from position detector 12 to interference fringe counter 16, the counter 16 starts to count the number of waves of electric signal S24. Then, when another position signal S25 is input from position detector 12 to the interference fringe counter 16 again, the counter 16 stops the counting and outputs the result K of the count to calculator 19.

On the other hand, when position signal S25 is input from position detector 12 to displacement counter 17, the counter 17 starts to count the number of waves of pulse signal S22. Then, when another position signal S25 is input from position detector 12 to the displacement counter 17 again, the counter 17 stops the counting and outputs the result N1 of the count to calculator 19.

Similarly, when position signal S25 is input from position detector 12 to displacement counter 18, the counter 18 starts to count the number of waves of pulse signal S21, and when another position signal S25 is input from position detector 12 to the displacement counter 18 again, the counter 18 stops the counting and outputs the result N2 of the count to calculator 19.

Calculator 19 conducts the process according to formula (a) shown below, based on the counting results N1 and N2 from displacement counters 17 and 18 so as to calculate displacement L of the moving mirror 4. In addition, calculator 19 conducts the process according to formula (b) shown below, based on displacement L and number K of waves of interference light from interference fringe counter 16 so as to specify wavelength λ of the light 23 to be measured and outputs data of the wavelength of the light to be measured to display 20.

$$L=(N1+N2)\times[\text{resolution of length measuring device}]/2 \quad (a)$$

$$\lambda = L/K \quad (b)$$

Display 20 displays the data of the wavelength of the light to be measured from calculator 19.

The optical wavelength meter shown in FIG. 4 requires a length measuring device with high accuracy in order to conduct the highly accurate measurement of the wavelength of the light to be measured. However, the accuracy of presently-obtainable length measuring devices is approximately 100 nm at best. FIG. 5 shows an example of the characteristic of the accuracy of such length measuring devices.

In addition, the length measuring device has a function of outputting an origin signal which indicates the center of the scale when the sensor passes the center of the scale.

In the length measuring device described above, measurement starting and stop points in the error characteristic shift at each measurement; therefore, the accuracy of the optical wavelength meter varies at each measurement. In this case, if fluctuation of the air and the accuracy of the optical elements which compose an interferometer are neglected, the accuracy of the optical wavelength meter is similarly determined in accordance with the accuracy of the length measuring device.

On the other hand, even if the accuracy of the distance between the starting point and the stop point is raised by correcting the predetermined displacement of the moving mirror by using a frequency-stabilized laser, there may occur (i) overshoot of the moving mirror by inertia force of the motor when the motor stops by receiving the motor inverting signal, and (ii) back-shift of the moving mirror by elastic force of the belt when the motor stops. Accordingly, it is impossible to detect accurate starting and stop points for wavelength measurement; thus, it is impossible to conduct the measurement of the wavelength based on the corrected measurement starting and stop points.

SUMMARY OF THE INVENTION

It is accordingly an object of the present invention to provide a highly accurate optical wavelength meter in which the accurate starting and stop points of the measurement are detected by using a detector which detects the back-shift of the moving mirror due to elastic force of the belt and an up-down counter which measures the amounts of the overshoot and the back-shift of the moving mirror so as to cancel the overshoot and the back-shift.

Therefore, the present invention provides an optical wavelength meter, wherein a wavelength of light to be measured is measured by an interferometer, the optical wavelength meter comprising: a light source to be measured which outputs the light to be measured; a beam splitter for splitting the light to be measured into two light portions; a moving mirror for reflecting one portion of the two light portions to the beam splitter; a linear moving mechanism for moving the moving mirror in one of the directions along the light axis of the light source by a motor; a length measuring device, including a scale and a sensor, for outputting first and second pulse signals whose phases differ from each other when the moving mirror moves, each pulse corresponding to the resolution of displacement of the sensor, and for outputting an origin signal when the sensor passes the center of the scale; a position detector for counting a predetermined number of waves of the first pulse signal by taking the origin signal from the length measuring device as a trigger signal, and for outputting a position signal when detecting that the moving mirror has moved a predetermined distance corresponding to the predetermined number; a motor controller for outputting an inverting signal to the motor and outputting a direction signal of the present rotation of the motor when inputting the position signal from the position detector; a state detector for detecting a state that the moving mirror is back shifted based on the direction signal of the rotation output from the motor controller and the first and second pulse signals from the length measuring device, and for outputting a detection signal; and an up-down counter for inputting the first pulse signal from the length measuring device, position signal from the position detector, and the detection signal from the state detector; calculating a quantity of overshoot of the moving mirror based on the position signal and the first pulse signal, the overshoot being caused by inertial force of the motor occurring at the stopping of the motor when the motor receives the inverting signal from the motor controller; calculating a quantity of back-shift of the moving mirror occurring at the stopping of the motor based on the detection signal and the first pulse signal; conducting an inverse operation for the quantities of the overshoot and the back-shift when the motor starts to rotate by reversing the rotational direction, so as to detect a state in which the moving mirror reaches the position at which the inverting signal was input to the motor; and when detecting said state, outputting a starting signal for measuring the wavelength.

According to the optical wavelength meter described above, light from the light source to be measured is split into two light portions, and one portion of the two light portions is reflected by the moving mirror and is input the beam splitter again. When the moving mirror moves in one of the directions along the light axis of the light source by using the linear moving mechanism, the length measuring device outputs the first and second pulse signals whose phases differ from each other. When She position detector detects that the moving mirror has moved a predetermined distance based on the origin signal and the first pulse signal, the position detector outputs the position signal. When the motor controller inputs the position signal, the controller reverses the rotational direction of the motor and outputs the direction signal of the present rotation of the motor to the state detector. The state detector inputs the first and second pulse signals from the length measuring device and the direction signal from the motor controller, and detects the state in which the moving mirror is back shifted. The up-down counter inputs the first pulse signal from the length measuring device and the detection signal from the state detector and calculates the quantities of the overshoot and the back-shift of the moving mirror to cancel the overshoot and the back-shift.

Therefore, even if there occurs the overshoot of the moving mirror caused by the inertia force of the motor and the back-shift of the moving mirror caused by the elastic force of the belt, the quantities of the overshoot and the back-shift are measured in order to cancel them; therefore, the length measuring device is corrected and an accurate optical wavelength meter can be obtained.

DESCRIPTION OF PREFERRED EMBODIMENTS

Hereinbelow, an embodiment of the optical wavelength meter according to the 0resent invention will be explained with reference to the drawings.

Figure 1:
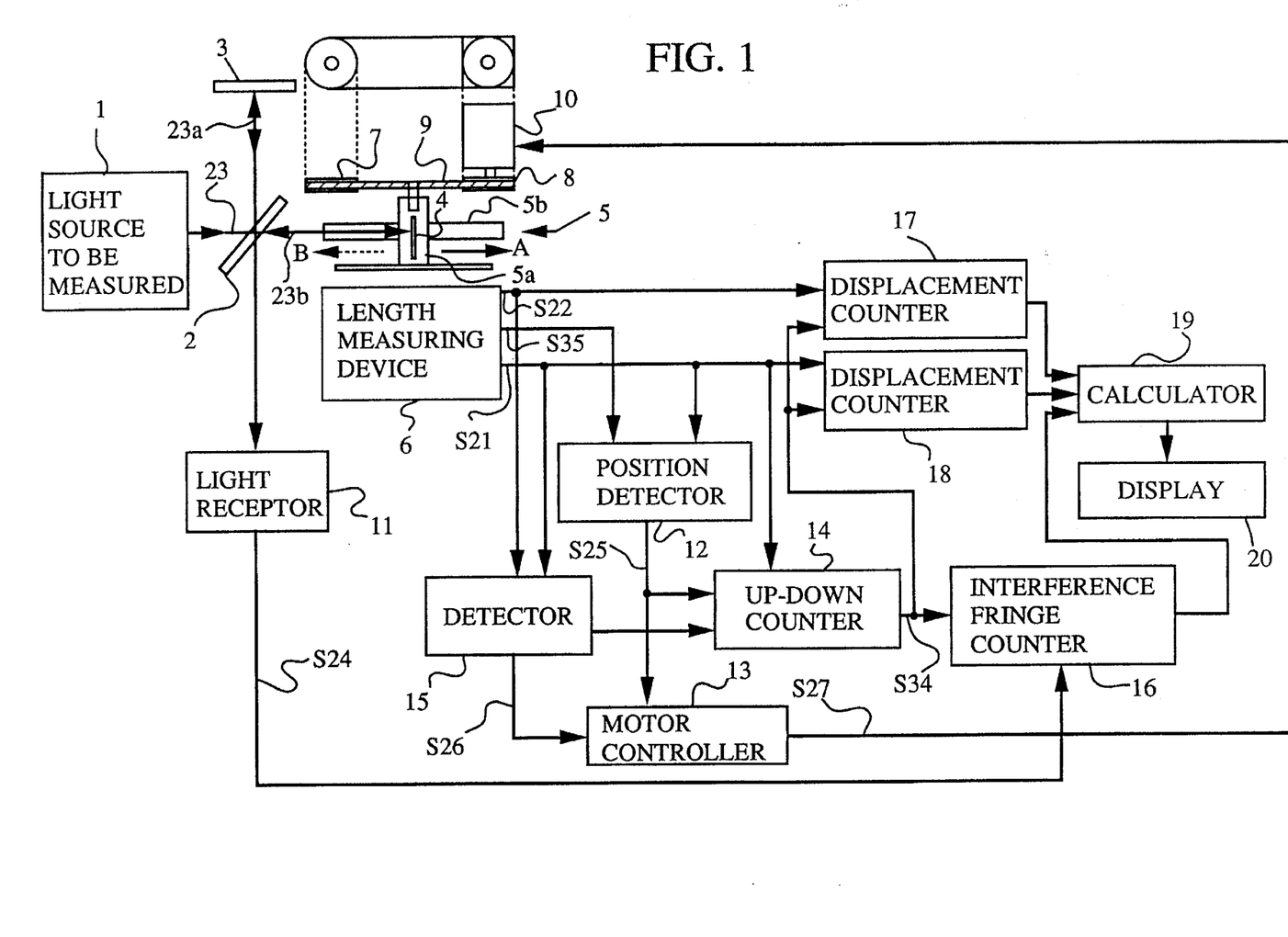
FIG. 1 is a block diagram showing a structural outline of the optical wavelength meter according to an embodiment of the present invention.
Figure 2:
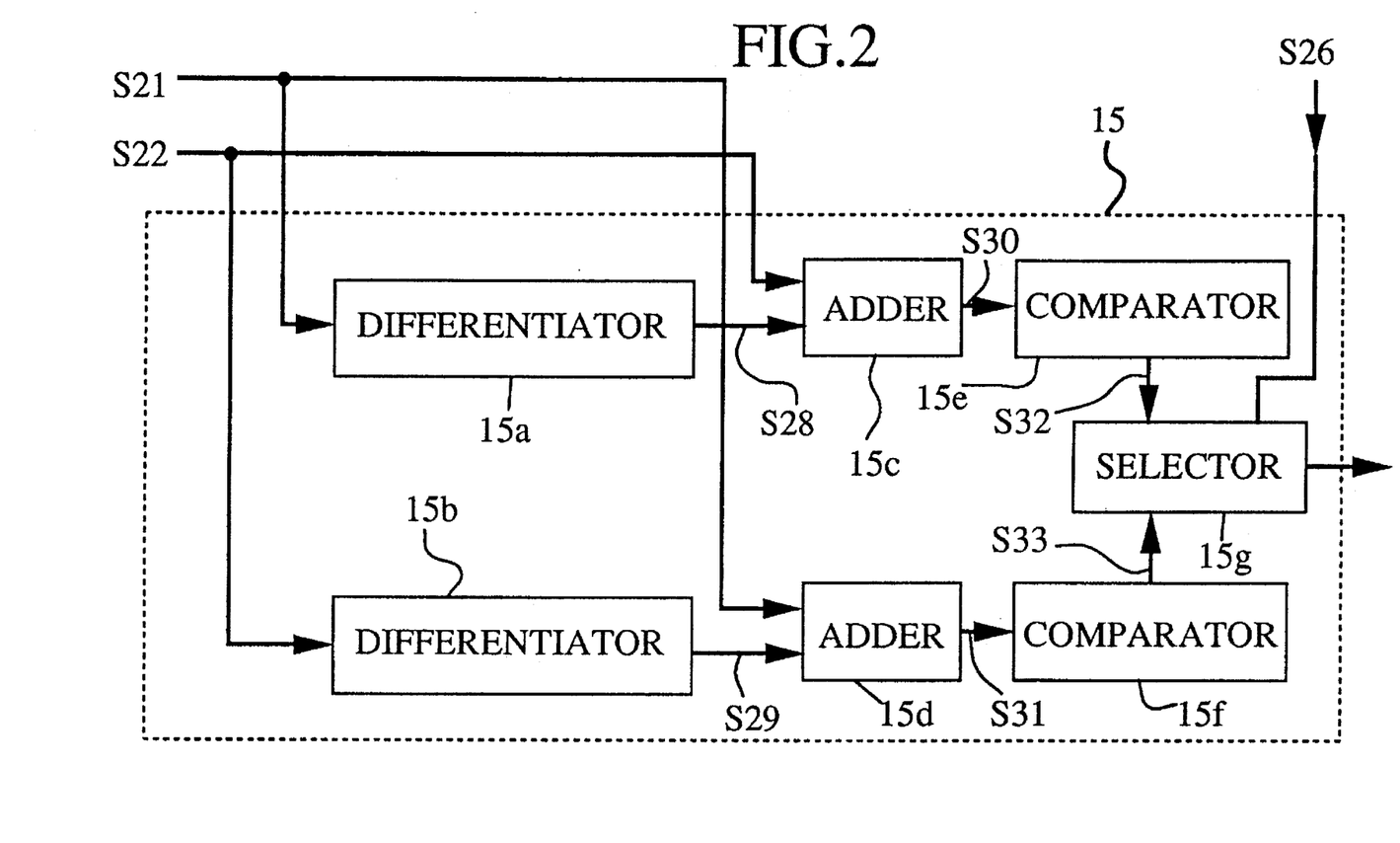
FIG. 2 is a detailed block diagram showing the structure of the detector shown in FIG. 1.
Figure 3:
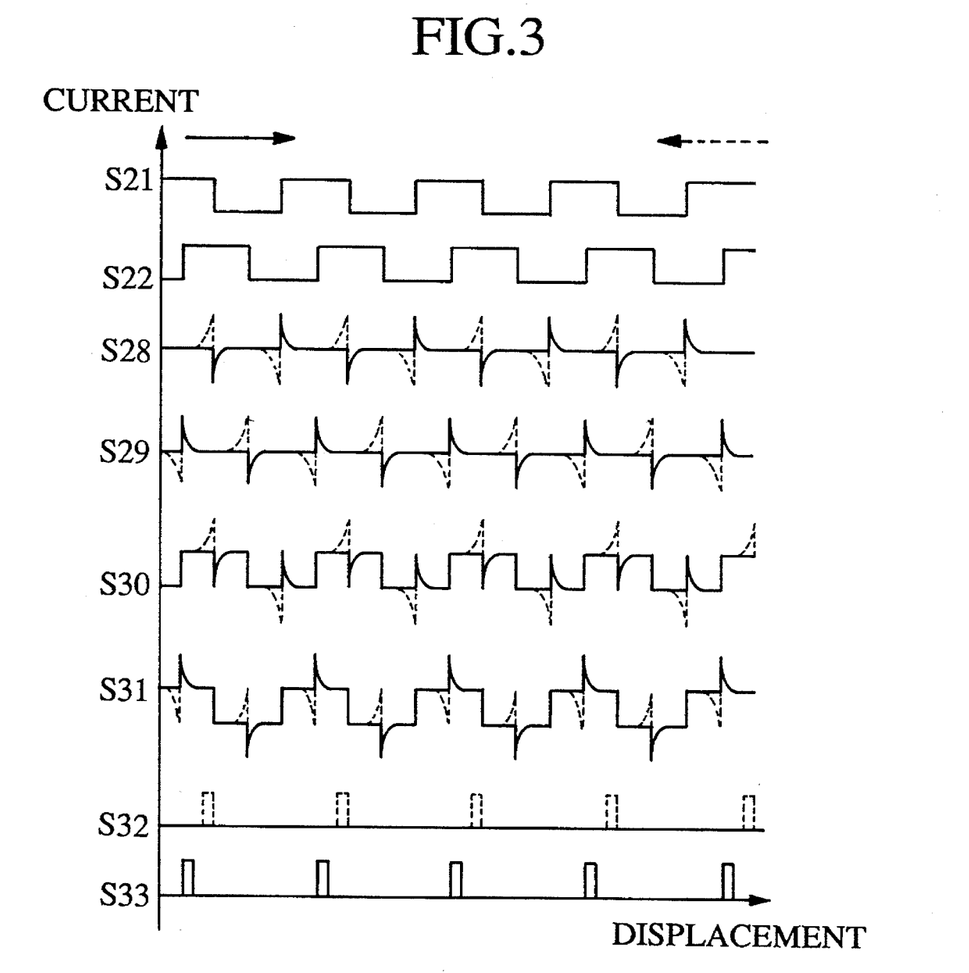
FIG. 3 is a waveform chart with regard to each signal shown in FIG. 2.

FIG. 1 is a block diagram showing a structural outline of the optical wavelength meter according to an embodiment of the present invention. FIG. 2 is a detailed block diagram showing the structure of detector 15 in FIG. 1. Furthermore, FIG. 3 is a waveform chart with regard to FIG. 2 wherein the vertical axis indicates the current, while the horizontal axis indicates the displacement of a moving stage. Each waveform indicated by each reference symbol (S21, S22, S28–S33) in FIG. 3 corresponds to a signal indicated by the same reference symbol in FIG. 2. In addition, the direction of the solid arrow and the direction of the dotted arrow in FIG. 3 correspond, respectively, to the direction of the solid arrow (indicated by reference symbol A) and the direction of the dotted arrow (indicated by reference symbol B) which indicate the motions of the moving mirror 4 in FIG. 1.

In FIG. 1, reference numeral 14 indicates an up-down counter and reference numeral 15 indicates a detector, and here, light source 1 to be measured is a frequency-stabilized laser light source. Other parts which are identical to those shown in FIG. 4 are given identical reference numerals, and an explanation thereof will be omitted here.

Light 23 to be measured, which is output from light source 1 to be measured and whose wavelength is unknown, is split into reflected light 23a and transmitted light 23b by beam splitter 2. The reflected light 23a is further reflected by fixed mirror 3 (for example, a corner-cube prism) and is transmitted through the beam splitter 2 to be incident on light receptor 11. On the other hand, transmitted light 23b is reflected by moving mirror 4 (for example, a corner-cube prism) and further reflected by the beam splitter 2 to be incident on light receptor 11.

Reflected light 23a and transmitted light 23b, both inputted into light receptor 11, interfere with each other; thus, electric signal S24 is output from the light receptor 11 to be input into interference fringe counter 16.

When motor 10 rotates, belt 9 (for example, a rubber belt) which is stretched over pulleys 7 and 8 moves in one of the directions along the light axis of light 23 (or 23b) and moving stage 5a of direct acting mechanism 5, the stage 5a being connected to the belt 9, and moving mirror 4 which is fixed to the stage 5a also move in one of the directions along the light axis of light 23. Accordingly, electric signal 24 becomes a signal which corresponds to the cyclic variation of light intensity due to the interference. In addition, the wavelength of the electric signal corresponds to the wavelength of light 23 to be measured.

When moving mirror 4 moves, length measuring device 6, which consists of a scale and a sensor, outputs pulse signal S21 to position detector 12, up-down counter 14, detector 15 and displacement counter 18. Each pulse of the signal corresponds to the length decided by the resolution of displacement of the sensor. At the same time, the length measuring device 6 outputs pulse signal 22, which is delayed by 90° with regard to the phase to the pulse signal S21, to detector 15 and displacement counter 17. In addition, when the sensor passes at the center of the scale in length measuring device 6, the device 6 outputs origin signal S35 to position detector 12.

Position detector 12 counts a predetermined number of waves of pulse signal S21 by taking the origin signal from the length measuring device as a trigger signal, so as to detect that the moving mirror 4 has moved by a predetermined distance corresponding to the predetermined number and to output position signal S25 to motor controller 13 and up-down counter 14.

Every time motor controller 13 receives the position signal S25, the controller 13 outputs an inverting signal S27 to motor 10 so as to invert the rotational direction of motor 10, and the controller 13 also outputs a rotational direction signal S26 which indicates the present rotational direction of the motor to detector 15. In regard to the rotational direction signal S26, the case of moving in the direction of the solid arrow is specified as the direction of the positive rotation of motor 10. When inverting signal S27 is input from motor controller 13 to motor 10, motor 10 reverses its rotational direction and continues rotating.

Hereinbelow, detector 15 will be explained in detail with reference to FIGS. 2 and 3. In FIG. 3, solid lines indicate signals in the case of moving mirror 4 moving in the direction indicated by the solid arrow in FIG. 1, while dotted lines indicate signals in the case of moving mirror 4 moving in the direction indicated by the dotted arrow in FIG. 1.

First, pulse signal S21 is differentiated by differentiator 15a to be input to adder 15c as differential signal S28. Adder 15c adds pulse signal S22 and differential signal S28 and outputs add signal S30 to comparator 15e. When moving mirror 4 moves in the direction indicated by the dotted arrow, comparator 15e outputs pulse signal S32 to selector 15g.

Similarly, pulse signal S22 is differentiated by differentiator 15b to be input to adder 15d as differential signal S29. Adder 15d adds pulse signal S21 and differential signal S29 and outputs add signal S31 to comparator 15f. When moving mirror 4 moves in the direction indicated by the dotted arrow, comparator 15e outputs pulse signal S33 to selector 15g.

When rotational direction signal S26 indicates the direction of reverse rotation, selector 15g chooses pulse signal S33 and outputs it to up-down counter 14, by which the state of moving mirror being shifted back by elastic force of belt 9 is reported to up-down counter 14.

On the other hand, when the rotational direction signal S26 indicates the direction of positive rotation, selector 15g chooses pulse signal S32 and outputs it to up-down counter 14, by which the state of moving mirror 4 being shifted back by elastic force of belt 9 is reported to up-down counter 14.

When detection signal S25 is input from position detector 12 to up-down counter 14, the counter 14 measures the quantity of the overshoot of moving mirror 4 by inertial force of the motor 10, by up-counting the pulse signal S21 from length measuring device 6.

In addition, when pulse signal S32 or S32 is input from detector 15 to up-down counter 14 via selector 15g, up-down counter 14 measures the quantity of the back-shift of moving mirror 4 by elastic force of the belt 9 at the stopping of the motor, by down-counting the pulse signal S21 from length measuring device 6.

Moreover, when motor 10 restarts after changing its rotating direction, up-down counter 14 detects that the moving mirror 4 has reached the position at which motor inverting signal S26 was input to motor 10, by conducting inverse operations for the quantities of the overshoot and the back-shift, and the counter 14 outputs measurement starting signal S34 to interference fringe counter 16, and displacement counters 17 and 18.

Then, when the measurement starting signal S34 is input from up-down counter 14 to interference fringe counter 16, the counter 16 starts counting the number of waves of electric signal S24 and stops the counting when receiving the position signal S25 from the position detector. The interference fringe counter 16 then outputs result K of the counting to calculator 19.

On the other hand, when the measurement starting signal S34 is input from up-down counter 14 to displacement counter 17, the counter 17 starts counting the number of waves of pulse signal S21 from length measuring device 6 and stops the counting when receiving the position signal S25 from the position detector. The displacement counter 17 outputs result N1 of the counting to calculator 19.

Similarly, when the measurement starting signal S34 is input from up-down counter 14 to displacement counter 18, the counter 18 starts counting the number of waves of pulse signal S22 from length measuring device 6 and stops the counting when receiving the position signal S25 from the position detector. The displacement counter 18 outputs result N2 of the counting to calculator 19.

Calculator 19 conducts the process of formula (c) shown below, based on results N1 and N2 of the counting from displacement counters 17 and 18, so as to calculate displacement L of moving mirror 4. Successively, calculator 19 conducts the process of formula (d) shown below, based on displacement L and the number K of waves of interference light from interference fringe counter 16, so as to calculate wavelength λ of the light 23 to be measured and outputs data of the wavelength to display 20.

$$L=(N1+N2)\times[\text{resolution of length measuring device}]/2 \quad (c)$$

$$\lambda=L/K \quad (d)$$

Display 20 displays the data of the wavelength of the light to be measured.

What is claimed is:

1. An optical wavelength meter, wherein a wavelength of light to be measured is measured by an interferometer, the optical wavelength meter comprising:

a light source to be measured which outputs the light to be measured;

a beam splitter for splitting the light to be measured into two light portions;

a moving mirror for reflecting one portion of the two light portions to the beam splitter;

a linear moving mechanism for moving the moving mirror in one of the directions along the light axis of the light source by a motor;

a length measuring device, including a scale and a sensor, for outputting first and second pulse signals whose phases differ from each other when the moving mirror moves, each pulse corresponding to the resolution of displacement of the sensor, and for outputting an origin signal when the sensor passes the center of the scale;

a position detector for counting a predetermined number of waves of the first pulse signal by taking the origin signal from the length measuring device as a trigger signal, and for outputting a position signal when detecting that the moving mirror has moved a predetermined distance corresponding to the predetermined number;

a motor controller for outputting an inverting signal to the motor and outputting a direction signal of the present rotation of the motor when inputting the position signal from the position detector;

a state detector for detecting a state that the moving mirror is back shifted based on the direction signal of the rotation output from the motor controller and the first and second pulse signals from the length measuring device, and for outputting a detection signal; and an up-down counter for inputting the first pulse signal from the length measuring device, position signal from the position detector, and the detection signal from the state detector; calculating a quantity of overshoot of the moving mirror based on the position signal and the first pulse signal, the overshoot being caused by inertial force of the motor occurring at the stopping of the motor when the motor receives the inverting signal from the motor controller; calculating a quantity of back-shift of the moving mirror occurring at the stopping of the motor based on the detection signal and the first pulse signal; conducting an inverse operation for the quantities of the overshoot and the back-shift when the motor starts to rotate by reversing the rotational direction, so as to detect a state in which the moving mirror reaches the position at which the inverting signal was input to the motor; and when detecting said state, outputting a starting signal for measuring the wavelength.

2. An optical wavelength meter comprising:

a light source to be measured which outputs the light to be measured;

a beam splitter for splitting the light to be measured into two light portions;

a fixed mirror for reflecting one portion of the two light portions to the beam splitter;

a moving mirror for reflecting the other portion of the two light portions to the beam splitter;

a linear moving mechanism, having pulleys located at a predetermined distance, parallel to the light axis of the light source, a belt which is stretched over the pulleys, a moving stage which holds the moving mirror and is connected to the belt, a guide rail for guiding the moving stage, and a motor for moving the belt in one of the directions along the light axis of the light source by rotating the pulleys, so as to move the moving mirror in one of the directions along the light axis;

a light receptor for receiving interference light which occurs by combining light from the fixed mirror and light from the moving mirror, and for transforming the interference light into an electric signal; and a length measuring device, including a scale and a sensor, for outputting first and second pulse signals whose phases differ by 90° from each other when the moving mirror moves, each pulse corresponding to the resolution of displacement of the sensor, and for outputting an origin signal when the sensor passes the center of the scale;

a position detector for counting a predetermined number of waves of the first pulse signal by taking the origin signal from the length measuring device as a trigger signal, and for outputting a position signal when detecting that the moving mirror has moved a predetermined distance corresponding to the predetermined number;

a motor controller for outputting an inverting signal to the motor and outputting a direction signal of the present rotation of the motor when inputting the position signal from the position detector;

a state detector for detecting a state in which the moving mirror is back shifted based on the direction signal of the rotation output from the motor controller and the first and second pulse signals from the length measuring device, and for outputting a detection signal;

an up-down counter for inputting the first pulse signal from the length measuring device, position signal from the position detector, and the detection signal from the state detector; calculating a quantity of overshoot of the moving mirror based on the position signal and the first pulse signal, the overshoot being caused by inertial force of the motor occurring at the stopping of the motor when the motor receives the inverting signal from the motor controller; calculating a quantity of back-shift of the moving mirror occurring at the stopping of the motor based on the detection signal and the first pulse signal; conducting an inverse operation for the quantities of the overshoot and the backshift when the motor starts to rotate by reversing the rotational direction, so as to detect a state in which the moving mirror reaches the position at which the inverting signal was input to the motor; and when detecting said state, outputting a measurement, starting signal;

an interference fringe counter for receiving the measurement starting signal and counting the number of waves of the electric signal output from the light receptor;

a first displacement counter for receiving the measurement starting signal and counting the number of waves of the first pulse signal from the length measuring device;

a second displacement counter for receiving the measurement starting signal and counting the number of waves of the second pulse signal from the length measuring device;

a calculator for calculating the wavelength of the light to be measured based on the number of waves of the interference light counted by the interference fringe counter and the numbers of the waves counted by the first and second counters, and for outputting the value of the wavelength; and a display for displaying the value of the wavelength from the calculator.

3. An optical wavelength meter in accordance with claim 1, wherein the light source to be measured is a frequency-stabilized laser light source.

4. An optical wavelength meter in accordance with claim 2, wherein the light source to be measured is a frequency-stabilized laser light source.

\* \* \* \* \*

UNITED STATES PATENT AND TRADEMARK OFFICE
CERTIFICATE OF CORRECTION

PATENT NO. : 5,486,918
DATED : January 23, 1996
INVENTOR(S) : Shinya NAGASHIMA

It is certified that error appears in the above-indentified patent and that said Letters Patent is hereby corrected as shown below:

Claim 2, Column 9, Line 22, delete "," after "measurement".

Signed and Sealed this

Eleventh Day of February, 1997

Attest:

BRUCE LEHMAN

Attesting Officer     Commissioner of Patents and Trademarks